United States Patent
Tubman et al.

(10) Patent No.: US 11,886,920 B2
(45) Date of Patent: Jan. 30, 2024

(54) METHODS AND APPARATUS FOR LOAD SHARING BETWEEN PRIMARY AND SECONDARY COMPUTING ENVIRONMENTS BASED ON EXPECTED COMPLETION LATENCY DIFFERENCES

(71) Applicant: Shopify Inc., Ottawa (CA)

(72) Inventors: Andrew Tubman, Ottawa (CA); Kevin O'Donnell, Ottawa (CA)

(73) Assignee: SHOPIFY INC., Ottawa (CA)

( * ) Notice: Subject to any disclaimer, the term of this patent is extended or adjusted under 35 U.S.C. 154(b) by 68 days.

(21) Appl. No.: 17/207,444

(22) Filed: Mar. 19, 2021

(65) Prior Publication Data

US 2022/0300325 A1    Sep. 22, 2022

(51) Int. Cl.
 *G06F 9/46* (2006.01)
 *G06F 9/50* (2006.01)
 *G06F 9/38* (2018.01)

(52) U.S. Cl.
 CPC ............ *G06F 9/505* (2013.01); *G06F 9/3877* (2013.01); *G06F 9/5038* (2013.01); *G06F 9/5061* (2013.01)

(58) Field of Classification Search
 CPC ...... G06F 9/505; G06F 9/3877; G06F 9/5038; G06F 9/5061
 See application file for complete search history.

(56) References Cited

U.S. PATENT DOCUMENTS

| | | | | |
|---|---|---|---|---|
| 5,371,852 A | * | 12/1994 | Attanasio | G06F 9/5061 709/245 |
| 10,423,558 B1 | * | 9/2019 | Fukami | G06F 9/544 |
| 10,757,157 B2 | * | 8/2020 | Lida | H04L 43/0852 |
| 11,372,689 B1 | * | 6/2022 | Allen | G06F 9/4887 |
| 2010/0251263 A1 | * | 9/2010 | Coelho | G06F 11/0709 719/314 |
| 2012/0034916 A1 | * | 2/2012 | Hu | H04W 28/24 455/432.1 |
| 2012/0096458 A1 | * | 4/2012 | Huang | G06F 9/5077 718/1 |
| 2013/0007272 A1 | * | 1/2013 | Breitgand | G06F 9/5077 709/224 |

(Continued)

OTHER PUBLICATIONS

Bayard Roberts, Oliver W Morga, Mohammed Ghaus Sultani, Peter Nyasulu, Sunday Rwebangila, Mark Myatt, 5 Egbert Sondorp, Daniel Chandramohan and Francesco Checchi; A new method to estimate mortality in crisis-affected and resource-poor settings; Sep. 9, 2010.*

(Continued)

*Primary Examiner* — Michael W Ayers

(74) *Attorney, Agent, or Firm* — Hanley, Flight & Zimmerman, LLC

(57) ABSTRACT

Methods, apparatus, systems and articles of manufacture for load shedding are disclosed. An example apparatus includes memory, and at least one processor to execute machine readable instructions to cause the at least one processor to at least access a request to execute a process using a second computing environment, the second computing environment being a replica of a first computing environment, determine an expected execution latency associated with execution of the process using the second computing environment, and reject the request in response to the expected execution latency exceeding a threshold.

20 Claims, 9 Drawing Sheets

(56) References Cited

U.S. PATENT DOCUMENTS

| | | | |
|---|---|---|---|
| 2013/0232184 A1* | 9/2013 | Grube | G06F 9/5066 |
| | | | 709/201 |
| 2014/0237477 A1* | 8/2014 | Cadambi | G06F 9/5044 |
| | | | 718/103 |
| 2017/0251076 A1* | 8/2017 | Bellur | H04L 67/61 |
| 2019/0044883 A1* | 2/2019 | Jurski | G06F 9/5005 |
| 2019/0129751 A1* | 5/2019 | Stanfill | G06F 11/1492 |

OTHER PUBLICATIONS

Canadian Patent Office, "Examiner's Report," issued in connection with Canadian Patent Appl. No. 3138791, dated Sep. 8, 2023, 6 pages.

* cited by examiner

FIG. 2

METHODS AND APPARATUS FOR LOAD SHARING BETWEEN PRIMARY AND SECONDARY COMPUTING ENVIRONMENTS BASED ON EXPECTED COMPLETION LATENCY DIFFERENCES

FIELD OF THE DISCLOSURE

This disclosure relates generally to database management, and, more particularly, to methods and apparatus for load shedding.

BACKGROUND

Data storage systems often attempt to store information in multiple locations (e.g., databases, filesystems, etc.) for redundancy purposes. In the event of a failure of one storage location (e.g., a primary location), the system may be able to recover using the data stored in the other location (e.g., a secondary location). Primary/secondary environments are typically used to ensure redundancy and enable a graceful recovery (e.g., using the secondary location) in the event of a disaster.

BRIEF DESCRIPTION OF THE DRAWINGS

FIG. 2 is an illustration of an example home page of an administrator of the e-commerce platform of FIG. 1.

The figures are not to scale. In general, the same reference numbers will be used throughout the drawing(s) and accompanying written description to refer to the same or like parts.

Figure 1:
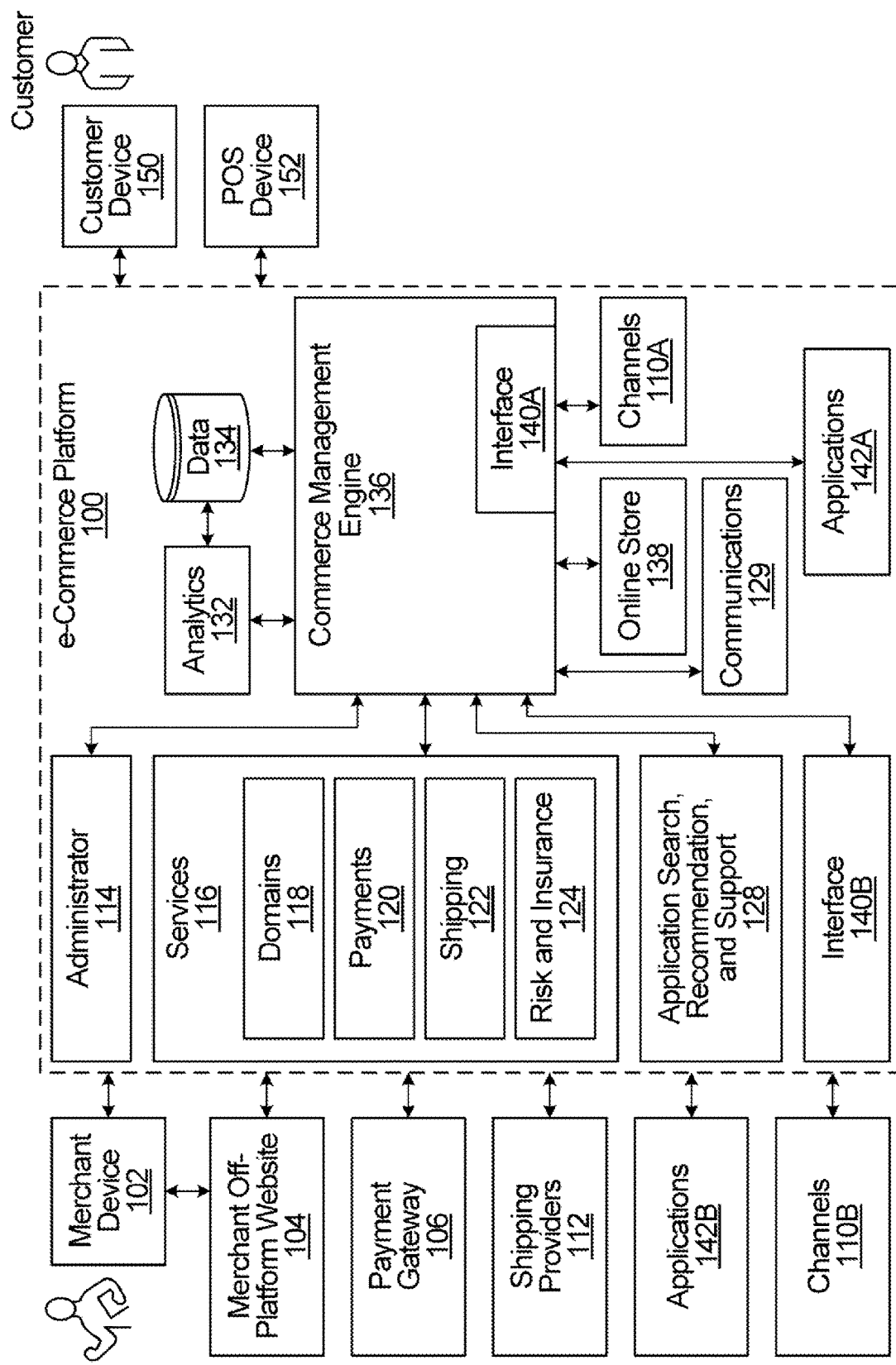
FIG. 1 is a block diagram of an example e-commerce platform.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

DETAILED DESCRIPTION

In some existing primary/secondary environments, backup is performed at the data level. In this manner, a request (e.g., a Structured Query Language (SQL) request, a hypertext transfer protocol (HTTP) request, etc.) is processed by a primary node and a result of the request is stored at the primary node. Subsequent to storage at the primary node, the data is synchronized to a secondary node. In such a configuration, the secondary node may lag behind the primary node. If a failure were to occur after a result of the request had been stored at the primary node, but prior to synchronization of the result to the secondary node, potentially irrecoverable data loss may occur. For example, when the secondary node is restored and/or promoted to a primary node, the result that had been stored at the (prior) primary node, would not be present.

While examples disclosed herein utilize primary and secondary terminology, other suitable terms may alternatively be used for such nodes. For example, the "primary" node may additionally or alternatively be referred to as a "master" node, "live" node, "lead" node, "main" node, "principal" node, "first" node, etc. Likewise, the "secondary" node may additionally or alternatively be referred to as a "replica" node, "slave" node, "backup" node, "duplicate" node, etc. Moreover, the "primary" and "secondary" are referred to as "node(s)", other suitable terminology may additionally or alternatively be used including, for example, controller, processor, computer, database, host, process, etc. Moreover, while the term "node" is used, other suitable terminology may additionally or alternatively be used to describe such node(s) including, for example, machine, computer, computing system, computing environment, etc.

In examples disclosed herein, backup/replication is performed at the request processing level. In other words, an incoming request is provided to both the primary node and the secondary node for processing. In some examples, the same request is provided to both the primary node and the secondary node. However, in some examples, different requests are provided to the primary and secondary nodes. For example, the primary node may be provided with a request to perform computation and store a result of the computation (e.g., computing taxes on an invoice then storing the final invoice record in a database), whereas the secondary node may be provided with a request to retrieve and store the result of the computation (e.g., retrieving and storing the final invoice record in a database). In some examples, the same request may be provided to both the primary and secondary node, and the secondary node (by virtue of being the secondary node) performs a modified version of the request (e.g., retrieving a result from the primary node instead of re-computing the result). In any event, because the request is processed and stored at both locations, the secondary node can be used in the event of a failure of the primary node. Typically, the primary system is allocated additional compute resources to enable the primary system to be more performant. In this manner, the secondary node may be allocated less compute resources. However, in such a primary/secondary system, the processing of incoming requests can fall out of sync between the primary node and the secondary node. For example, such a configuration allows the secondary node to lag behind the primary node during periods of increased incoming requests, and catch up to the primary node during periods of decreased incoming requests.

In the event of a failure of the primary node, the secondary node takes over the role of primary node, and may handle any requests that had not yet been processed at the secondary node, as well as handle any unprocessed requests at the prior primary node as those requests are retried. That is, a secondary node may have a backlog of requests that need to be processed before the secondary node is fully synchronized with the primary node. In some examples, the amount of unprocessed requests that the secondary node lags behind the primary node may exceed an amount of requests where the secondary node could be promoted to the primary node without undue delay.

For example, a primary node and a secondary node can become out of sync when the primary node is implemented in a multi-threaded environment and the secondary node is implemented in a single-threaded environment. While the secondary node may lag the primary node, the secondary node can catch up the primary node over time by processing the requests in a sequential fashion. Unfortunately, sometimes the lag of the secondary node can become material, leading to a real risk of data loss if a secondary node were needed as a fall back due to a failure of the primary node. A lag between a primary node and a secondary node can occur even if both the primary node and the secondary node are multi-threaded because an unequal amount of computing resources may be allocated between the primary node and the secondary node. Ideally, a backlog of requests to be processed at the secondary node to be in sync with the primary node should be as small as possible in the event that the secondary node is needed as a fall back (e.g., should the primary node fail).

While subsequent examples disclosed herein are related to the use of the load shedding of a secondary node (e.g., a secondary computing environment) within the context of an e-commerce platform, such an approach to load shedding may additionally or alternatively be applicable to other computing systems to provide redundancy and fail-over capabilities.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an online business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
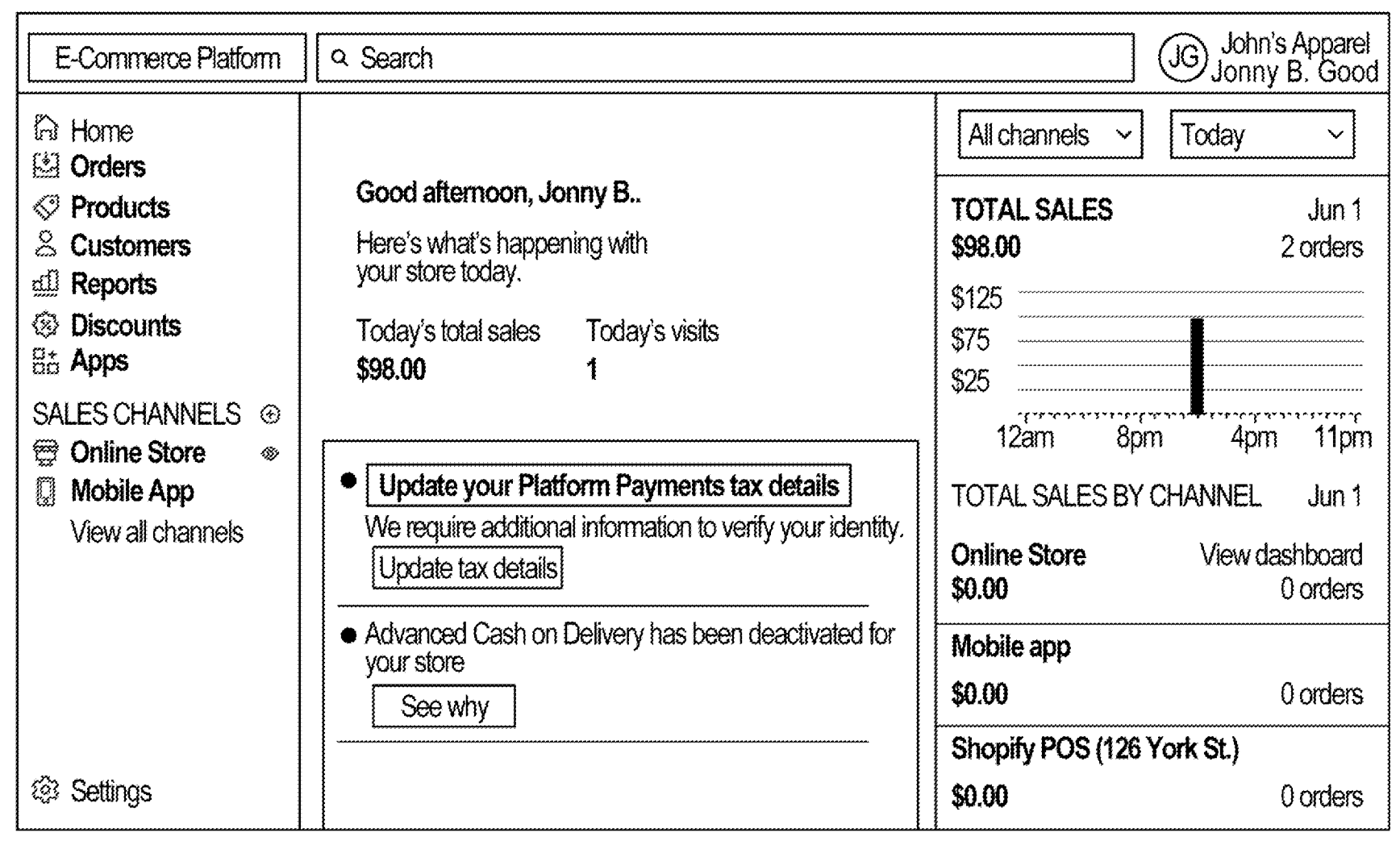

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform

100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementation in an e-Commerce Platform

Figure 3:
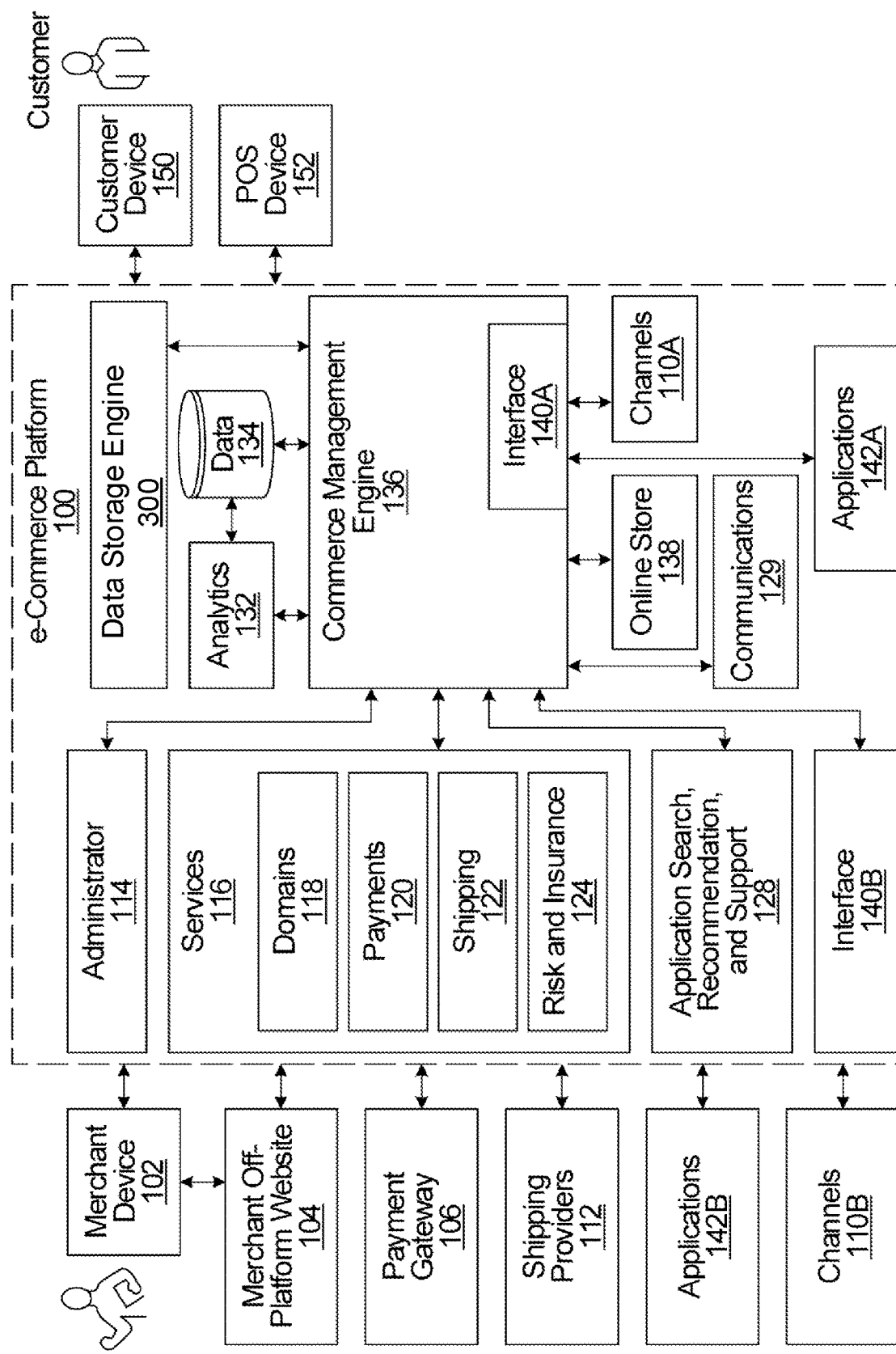
FIG. 3 illustrates the e-commerce platform of FIG. 1 but including a data storage engine.

The functionality described herein may be used in commerce to provide improved customer, buyer, or vendor experiences. The e-commerce platform 100 could implement the functionality for any of a variety of different applications, examples of which are described elsewhere herein. FIG. 3 illustrates the e-commerce platform 100 of FIG. 1 but including a data storage engine 300. The data storage engine 300 is an example of a computer-implemented system that implements the functionality described herein for use by the e-commerce platform 100, the customer device 150 and/or the merchant device 102. More particularly, the data storage engine 300 implements the primary/secondary system for processing and/or storage of incoming requests.

Although the data storage engine 300 is illustrated as a distinct component of the e-commerce platform 100 in FIG. 3, this is only an example. A data storage engine could also or instead be provided by another component residing within or external to the e-commerce platform 100. In some embodiments, either or both of the applications 142A-B provide a data storage engine that implements the functionality described herein to make it available to customers and/or to merchants. Furthermore, in some embodiments, the commerce management engine 136 provides that engine. However, the location of the data storage engine 300 is implementation specific. In some implementations, the data storage engine 300 is provided at least in part by an e-commerce platform, either as a core function of the e-commerce platform or as an application or service supported by or communicating with the e-commerce platform. Alternatively, the data storage engine 300 may be implemented as a stand-alone service to clients such as a customer device 150 or a merchant device 102. In addition, at least a portion of such an engine could be implemented in the merchant device 102 and/or in the customer device 150. For example, the customer device 150 could store and run an engine locally as a software application.

As discussed in further detail below, the data storage engine 300 could implement at least some of the functionality described herein. Although the embodiments described below may be implemented in association with an e-commerce platform, such as (but not limited to) the e-commerce platform 100, the embodiments described below are not limited to e-commerce platforms.

Further, while the data storage engine 300 of FIG. 3 is illustrated as a single element, in some examples, the data storage engine 300 may be implemented as multiple different elements. For example, as described below in connection with FIG. 4, the example data storage engine 300 may include multiple nodes for processing and/or storage of data. To that end, each of the nodes may be implemented by separate computing components. For example, such nodes may be implemented by different physical computing components (e.g., separate physical servers) and/or may be implemented by different virtual computing components (e.g., separate virtual machines, separate virtual containers, etc.).

Figure 4:
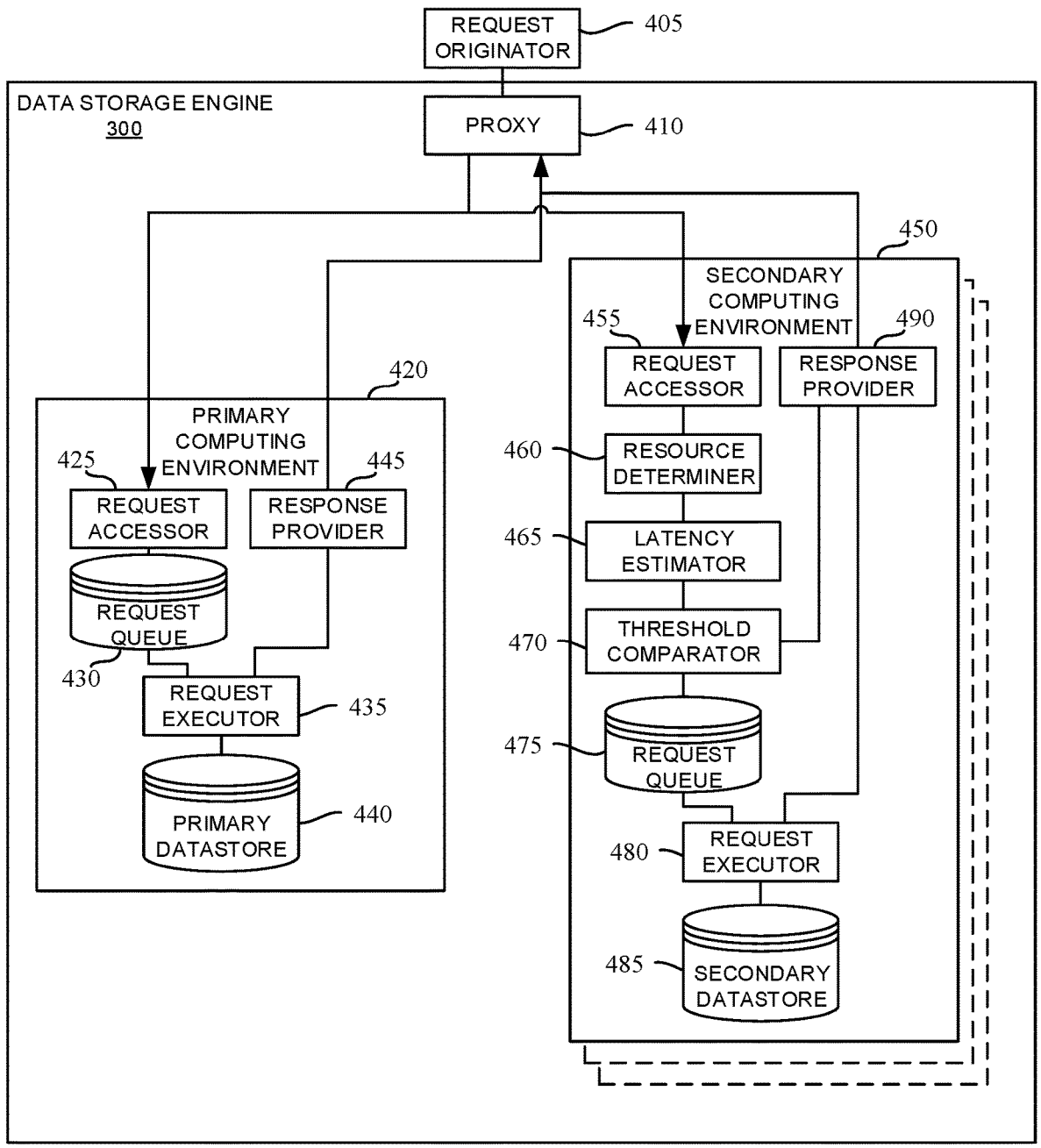
FIG. 4 is a block diagram illustrating an example implementation of the data storage engine of FIG. 3.

FIG. 4 is a block diagram illustrating an example implementation of the data storage engine 300 of FIG. 3. The example data storage engine 300 receives a request from a request originator 405. The request is received by a proxy 410 of the data storage engine 300 and is routed to a primary computing environment 420 and/or a secondary computing environment 450.

The example request originator 405 represents an entity that originated a request for processing at the primary computing environment 420 and/or the secondary computing environment 450. In some examples, the request originator 405 may represent a client (e.g., an end user device) in communication with the example e-commerce platform 100 of FIG. 1. However, in some other examples, the request originator 405 may represent one or more elements of the e-commerce platform 100 including, for example, one or more of the services 116, the interface 140B, the commerce management engine 136, the applications 142A, etc.

The proxy 410 of the illustrated example routes requests to the primary computing environment 420 and/or the secondary computing environment 450. On the return path, the example proxy 410 routes responses to those requests to the request originator 405.

The primary computing environment 420 includes a request accessor 425, a request queue 430, a request executor 435, a primary datastore 440, and a response provider 445. As requests are received at the request accessor 425, the request accessor 425 queues execution of those requests in the request queue 430, and the request executor 435 executes the queued request with an objective of providing a desired level of performance (e.g., lowest latency). In this manner, the request executor 435 may operate on the requests in a multi-threaded fashion. In some examples, the request executor 435 selects an order in which the requests are to be processed to, in general, obtain the desired level of performance. Upon execution of the requested instructions, the example request executor 435 stores the result of the execution of the instruction in the primary datastore 440. The request executor 435, in some examples, causes the response provider 445 to provide a response to the request originator 405.

The example request accessor 425, the example request executor 435, and/or the example response provider 445 of the illustrated example of FIG. 4 are implemented by one or more logic circuit(s) such as, for example, a hardware processor(s). However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc.

The example request queue 430 of the illustrated example of FIG. 4 is implemented by any memory, storage device and/or storage disc for storing data such as, for example, flash memory, magnetic media, optical media, solid state memory, hard drive(s), thumb drive(s), etc. Furthermore, the data stored in the example request queue 430 may be in any data format such as, for example, binary data, comma delimited data, tab delimited data, structured query language (SQL) structures, etc. While, in the illustrated example, the request queue 430 is illustrated as a single device, the example request queue 430 and/or any other data storage devices described herein may be implemented by any number and/or type(s) of memories. In the illustrated example of FIG. 4, the example request queue 430 stores queued requests that are to be executed by the request executor 435. In examples disclosed herein, the requests are SQL requests. However, any other type of requests may additionally or alternatively be used including, for example, hypertext transfer protocol (HTTP) requests, etc.

Likewise, the example primary datastore 440 of the illustrated example of FIG. 4 is implemented by any memory, storage device and/or storage disc for storing data such as, for example, flash memory, magnetic media, optical media, solid state memory, hard drive(s), thumb drive(s), etc. Furthermore, the data stored in the example primary datastore 440 may be in any data format such as, for example, binary data, comma delimited data, tab delimited data, structured query language (SQL) structures, etc. While, in the illustrated example, the primary datastore 440 is illustrated as a single device, the example primary datastore 440 and/or any other data storage devices described herein may be implemented by any number and/or type(s) of memories.

The example secondary computing environment includes a request accessor 455, a resource determiner 460, a latency estimator 465, a threshold comparator 470, a request queue 475, a request executor 480, a secondary datastore 485, and a response provider 490.

The example request accessor 455, the example resource determiner 460, the example latency estimator 465, the example threshold comparator 470, the example request executor 480, and/or the example response provider 490 of the illustrated example of FIG. 4 are implemented by one or more logic circuit(s) such as, for example, a hardware processor(s). However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc.

The example resource determiner 460 of the illustrated example of FIG. 4, upon receipt of a request by the request accessor 455, calculates a resource need for the execution of the process at the secondary computing environment. The calculated cost may be based on, for example, availability of compute resources at the secondary computing environment 450, a size of the request, a number of arguments in the request, a number of libraries imported by the request, information from the primary computing environment (which may have already performed the requested task or a task similar to the requested task), historic records for prior performances of the requested task, a rate at which other tasks are being received from the source of the request, a rate at which other tasks are being received from other sources, etc. In some examples, the resource determiner 460 interfaces with the primary datastore 440 of the primary computing environment 420 to obtain execution statistics associated with execution of the request by the primary computing environment 420.

The example latency estimator 465 of the illustrated example of FIG. 4 determines an expected execution latency associated with the potential execution of the process at the secondary computing environment. In some examples, the expected execution latency is based on the calculated resource need. In some examples, the expected latency is calculated based on a difference between a first amount of time estimated for execution of the process at the second computing environment, and a second amount of time estimated for execution of the process using the first computing environment. The difference between the first amount of time and the second amount of time may be a result of, for example, the resource asymmetry between the first computing environment and the second computing environment.

The example threshold comparator 470 of the illustrated example of FIG. 4 determines whether the expected execution latency exceeds a latency threshold. The example latency threshold represents an amount of time that the secondary computing environment 450 would need for execution of any unexecuted requests should the secondary computing environment 450 need to assume the role of the primary computing environment. In this manner, the latency threshold is selected to be a maximum amount of time that would be acceptable for execution of the remaining requests. In some examples, the latency threshold is one minute. However, any other latency threshold may additionally or alternatively be used.

The example request queue 475 of the illustrated example of FIG. 4 is implemented by any memory, storage device and/or storage disc for storing data such as, for example, flash memory, magnetic media, optical media, solid state memory, hard drive(s), thumb drive(s), etc. Furthermore, the data stored in the example request queue 475 may be in any data format such as, for example, binary data, comma delimited data, tab delimited data, structured query language (SQL) structures, etc. While, in the illustrated example, the request queue 475 is illustrated as a single device, the example request queue 475 and/or any other data storage devices described herein may be implemented by any number and/or type(s) of memories. In the illustrated example of FIG. 4, the example request queue 475 stores information concerning requests for execution by the request executor 480.

The example request executor 480 of the illustrated example of FIG. 4 executes requests that are queued in the request queue 475. The example request executor 480 causes storage of a result of the execution in the secondary datastore 485. Upon completion of the execution of the request, in some examples, the request executor 480 causes the response provider 490 to provide a response to the request originator 405. In examples disclosed herein, the request executor 480 of the secondary computing environment 450 is allocated less computing resources (e.g., compute resources, memory resources, etc.) than the request executor 435 of the primary computing environment 420. Moreover, in some examples, the request executor The example secondary datastore 485 of the illustrated example of FIG. 4 is implemented by any memory, storage device and/or storage disc for storing data such as, for example, flash memory, magnetic media, optical media, solid state memory, hard drive(s), thumb drive(s), etc. Furthermore, the data stored in the example secondary datastore 485 may be in any data format such as, for example, binary data, comma delimited data, tab delimited data, structured query language (SQL) structures, etc. While, in the illustrated example, the secondary datastore 485 is illustrated as a single device, the example secondary datastore 485 and/or any other data storage devices described herein may be implemented by any number and/or type(s) of memories. In the illustrated example of FIG. 4, the example secondary datastore 485 stores results of execution of the request executor 480.

The example response provider 490 of the illustrated example of FIG. 4 provides a response to the request(s) received at the request accessor 455. In some examples, the response indicates that the request executor 480 has completed execution of the request. In some other examples, the response is a rejection message, and indicates to the request originator 405 that the request has been rejected. Such a rejection message enables the request originator 405 to delay and resubmit the request for execution by the secondary computing environment. In some examples, the request originator 405 might decide not to re-submit the request.

While an example manner of implementing the data storage engine 300 of FIG. 3 is illustrated in FIG. 4, one or more of the elements, processes and/or devices illustrated in FIG. 4 may be combined, divided, re-arranged, omitted, eliminated and/or implemented in any other way. Further, the example request accessor 455, the example resource determiner 460, the example latency estimator 465, the example threshold comparator 470, the example request executor 480, the example response provider 490, and/or, more generally, the example secondary computing environment 450 of the example data storage engine 300 of FIGS. 3 and/or 4 may be implemented by hardware, software, firmware and/or any combination of hardware, software and/or firmware. Thus, for example, any of the example request accessor 455, the example resource determiner 460, the example latency estimator 465, the example threshold comparator 470, the example request executor 480, the example response provider 490, and/or, more generally, the example secondary computing environment 450 of the example data storage engine 300 of FIGS. 3 and/or 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example request accessor 455, the example resource determiner 460, the example latency estimator 465, the example threshold comparator 470, the example request executor 480, and/or the example response provider 490 is/are hereby expressly defined to include a non-transitory computer readable storage device or storage disk such as a memory, a digital versatile disk (DVD), a compact disk (CD), a Blu-ray disk, etc. including the software and/or firmware. Further still, the example secondary computing environment 450 of FIG. 4 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
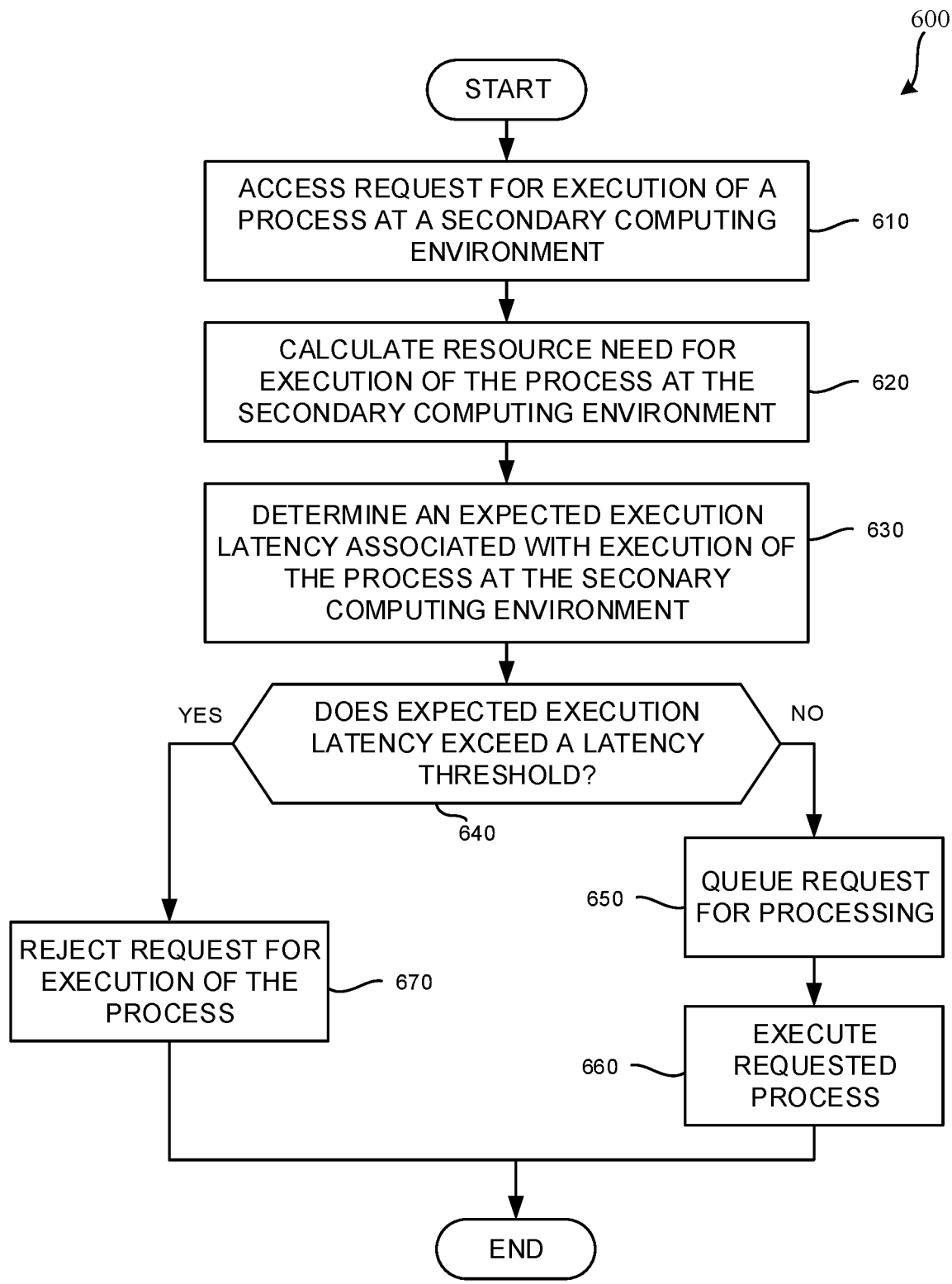
FIG. 6 is a flowchart representative of machine readable instructions which may be executed to implement the example secondary node of FIG. 4 to perform load shedding of incoming requests.

Flowcharts representative of example hardware logic, machine readable instructions, hardware implemented state machines, and/or any combination thereof for implementing the secondary computing environment 450 of FIG. 4 are shown in FIGS. 6 and/or 7. The machine readable instructions may be one or more executable programs or portion(s) of an executable program for execution by a computer processor and/or processor circuitry, such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 6 and/or 7, many other methods of implementing the example secondary computing environment 450 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: Ruby, C, C++, Java, C#, Perl, Python, JavaScript, HyperText Markup Language (HTML), Structured Query Language (SQL), Swift, etc.

As mentioned above, the example processes of FIGS. 6 and/or 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 5:
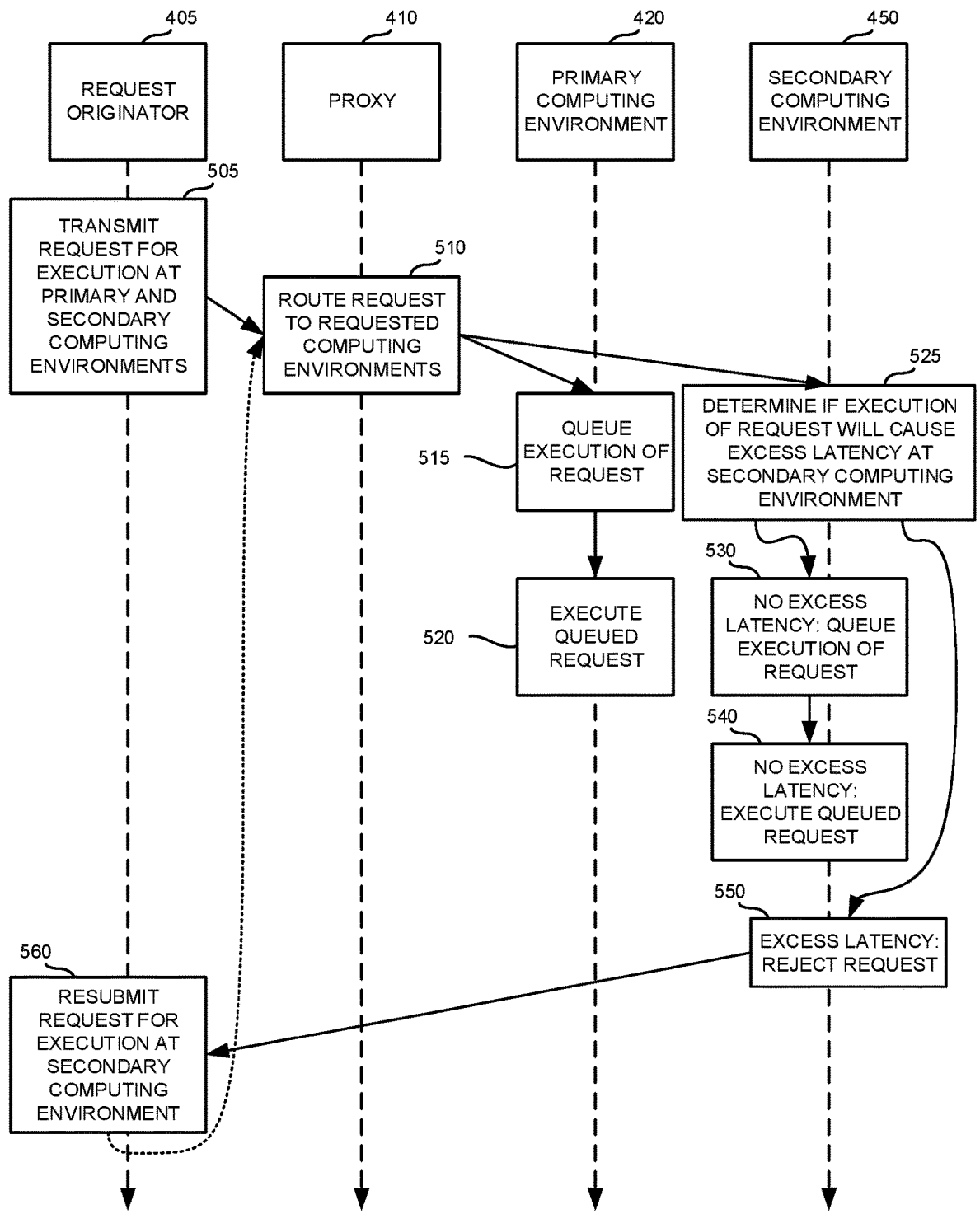
FIG. 5 is a communication diagram representing operations of the request originator, the proxy, the primary node, and the secondary node of FIG. 4.

FIG. 5 is a communication diagram representing operations of the request originator 405, the proxy 410, the primary node 420, and the secondary node 450 of FIG. 4. The vertical axis of FIG. 5 generally represents time. The example communications of FIG. 5 begin when the example request originator 405 transmits a request for execution at primary and secondary computing environments to the proxy 410. (Block 505). The proxy 410 routes the request to the requested computing environments. (Block 510). For example, if the request provided by the request originator 405 indicates that the request is to be executed by both of the primary and secondary computing environments (and/or omits an indication of a selection of a particular computing environment), the example proxy 410 may route the incoming request to both the primary computing environment 420 and the secondary computing environment 450.

The primary computing environment 420, having received the request from the proxy 410, queues execution of the request. (Block 515). The primary computing environment 420 then executes the queued request. (Block 520). In some examples, execution of the queued request results in the primary computing environment 420 transmitting a response to the initial request. Such a response may indicate, for example, that the processing of the request is complete and/or may provide a result of the requested processing.

As requests are received at the primary computing environment 420, the primary computing environment 420 operates on those requests with an objective of providing a desired level of performance (e.g., lowest latency). In this manner, the primary computing environment 420 may operate on the requests in a multi-threaded fashion. In some examples, the primary computing environment 420 may select an order in which the requests are to be processed to, in general, obtain the desired level of performance.

As the requests are received at the secondary computing environment, the secondary computing environment 450 operates on those requests to achieve a lowest possible number of unsynchronized requests. That is, while the primary computing environment 420 executes requests in an order to provide a desired level of performance for the originators, the secondary computing environment 450 executes requests in an order to achieve the lowest backlog of unprocessed requests.

In some examples, if the primary computing environment 420 failed, the secondary computing environment 450 is first prompted. The secondary computing environment 450 begins processing of requests that need to be retried because the unavailable (prior) primary computing environment 430 could not process those requests. As an alternative, keeping the secondary computing environment more closely synchronized with the primary computing environment reduces possible data loss in the event that the secondary computing environment is to be promoted. For example, if the secondary computing environment is five minutes behind the primary computing environment and needs to be promoted, the secondary computing environment might be missing five minutes worth of data that had already been successfully processed by the primary.

The secondary computing environment 450, having received the request from the proxy 410, determines whether execution of the request will cause excess latency and/or, more generally, lag, at the secondary computing environment 450. (Block 525). In examples disclosed herein, lag represents a number of requests that have been processed by the primary computing system 420, but have not yet been processed by the secondary computing environment 450. In other words, lag represents requests that are in the request queue 475 of the secondary node 450 that are not present in the request queue 430 of the primary node 420. As used herein, latency represents an amount of time that is expected to be needed for processing the number of unprocessed requests by the secondary node 450. In general, keeping lag and/or latency of the secondary computing system 450 low enables the secondary computing environment 450 to quickly assume the role of the primary computing environment 420, should there be a failure of the primary computing environment 420. In some examples, the secondary computing environment 450 may base the decision of whether to allow a request to be added to the request queue 475 of the secondary node 450 on an effect of the request on the expected latency of the secondary node 450.

If the example secondary computing environment 450 determines that the execution of the request would not cause excess latency at the secondary computing environment 450, the example secondary computing environment 450 queues the execution of the request. (Block 530). The secondary computing environment 450 then executes the queued request. (Block 540). In some examples, execution of the queued request results in the secondary computing environment 420 transmitting a response to the initial request. In contrast to the response message provided by the primary computing environment 420, the response message provided by the secondary computing environment may simply be confirmatory in that it confirms that the processing of the request by the secondary computing environment 450 has been completed. That is, the response message provided by the secondary computing environment 450 need not provide the result of the requested processing, as it is anticipated that the result of such processing would be provided to the request originator as a result of the execution of the request by the primary computing environment 420.

If the example secondary computing environment 450 determines that the execution of the request by the secondary computing environment 450 would cause excess latency at the secondary computing environment 450, the secondary computing environment rejects the request. (Block 550). By rejecting the request, the secondary computing environment 450 indicates to the request originator 405 that the processing of the request by the secondary computing environment 450 will not be completed. This allows the request originator 405 to determine if the request should be re-submitted at a later time and, if so, to resubmit the request for execution at the secondary computing environment 450. (Block 560). In this manner, the request can later be routed through the proxy 410 to the secondary computing environment 450 for re-execution.

In some examples, the request originator 405 may determine that the re-execution of the request at the secondary computing environment 450 is not necessary and, thus, might not re-submit the request for execution. For example, if the request originally transmitted by the request originator 405 requested performance of instructions for retrieving current pricing information for an item that is to be displayed via a user interface (e.g., via a webpage), the request originator 405 might not have used the result that would have been provided by the secondary computing environment 450. For example, as the primary computing environment 420 may have already calculated and provided the value to the request originator (e.g., as a result of the execution of block 520), there may be no need to obtain such a result from the secondary computing environment 450. Moreover, there may be no need to even have the execution of the request by the secondary computing environment 450 recorded at the secondary computing environment 450, as record of such execution might not be needed in the event of a failure of the primary computing environment 420.

FIG. 6 is a flowchart representative of machine readable instructions 600 which may be executed to implement the example secondary node of FIG. 4 to perform load shedding of incoming requests. The example instructions 600 begin when the example request accessor 455 accesses a request for execution of a process at a secondary computing environment. (Block 610). The example resource determiner 460 calculates a resource need for the execution of the process at the secondary computing environment. (Block 620). The calculated cost may be based on, for example, availability of compute resources at the secondary computing environment 450, a size of the request, a number of arguments in the request, a number of libraries imported by the request, information from the primary computing environment (which may have already performed the requested task or a task similar to the requested task), historic records for prior performances of the requested task, a rate at which other tasks are being received from the source of the request, a rate at which other tasks are being received from other sources, etc.

The example latency estimator 465 determines an expected execution latency associated with the potential execution of the process at the secondary computing environment. (Block 630). In some examples, the expected execution latency is based on the calculated resource need. In some examples, the expected latency is calculated based on a difference between a first amount of time estimated for execution of the process at the second computing environment, and a second amount of time estimated for execution of the process using the first computing environment. The difference between the first amount of time and the second amount of time may be a result of, for example, the resource asymmetry between the first computing environment and the second computing environment.

While examples disclosed herein refer to the execution latency in the units of time, other approaches to estimating execution latency and/or the estimated effect(s) of execution of a received request may additionally or alternatively be used. For example, classes of requests (e.g., requests to write information to the database) may be deemed as a potential source of replication lag, whereas other requests (e.g., requests to read information from the database) may not be considered to be a source of replication lag. Additionally or alternative, another dimension that might be utilized is a priority of a request. For example, merchant facing requests (e.g., adding a payment method) may be considered high priority, and may not be subject to load shedding (e.g., as shedding of such a load may adversely impact a user experience). In contrast, a background job that archives data on a weekly basis might be considered low priority and, therefore, be subject to load shedding.

The example threshold comparator 470 determines whether the expected execution latency exceeds a latency threshold. (Block 640). The example latency threshold represents an amount of time that the secondary computing environment 450 would need for execution of any unexecuted requests should the secondary computing environment 450 need to assume the role of the primary computing environment. In this manner, the latency threshold is selected to be a maximum amount of time that would be acceptable for execution of the remaining requests. In some examples, the latency threshold is one minute. However, any other latency threshold may additionally or alternatively be used. If the expected execution latency does not exceed the latency threshold (e.g., block 640 returns a result of NO), the example threshold comparator 470 queues the request for processing by adding the request to the request queue 475. (Block 650). The example request executor 480 then executes the requested process, and stores a result of the execution in the secondary datastore 485. (Block 660).

If the example threshold comparator 470 determines that the expected execution latency meets or exceeds the latency threshold (e.g., block 640 returns a result of YES), the example response provider 490 rejects the request for execution of the process. (Block 670). The request is rejected by sending a message to the request originator 405 informing the request originator 405 of the non-execution of the request. Such rejection message enables the request originator 405 to determine if the request should be re-submitted. If so, the request originator 405 may delay and resubmit the request at a later time. While such delay and/or re-submission might increase the time until such request is processed by the secondary computing environment, such delay reduces any staleness of the queue at the secondary computing environment. Such a configuration advantageously allows the request originator 405 to selectively not re-submit rejected requests (as the information provided by such request may have already been provided by the primary computing environment). Moreover, delaying such request for execution ideally enables the servicing of the request to take place during a period of lower latency at the secondary computing environment 450. The example process 600 of FIG. 6 then terminates, but may be re-executed in response to receipt of a subsequent request at the request accessor 455.

In some alternative examples, prior to calculation of the resource need (e.g., block 620), the example threshold comparator 470 determines whether any lag exists (e.g., whether a threshold amount of unprocessed requests exist in the request queue 475). If the threshold amount of lag (e.g., unprocessed requests) does not exist, then control may simply proceed to block 650, where the request is queued for processing without calculation of the expected latency caused by execution of such request. Such an approach reduces any computational overhead of calculating the expected execution latency during periods when there is no lag between the primary computing environment 420 and the secondary computing environment 450.

Figure 7:
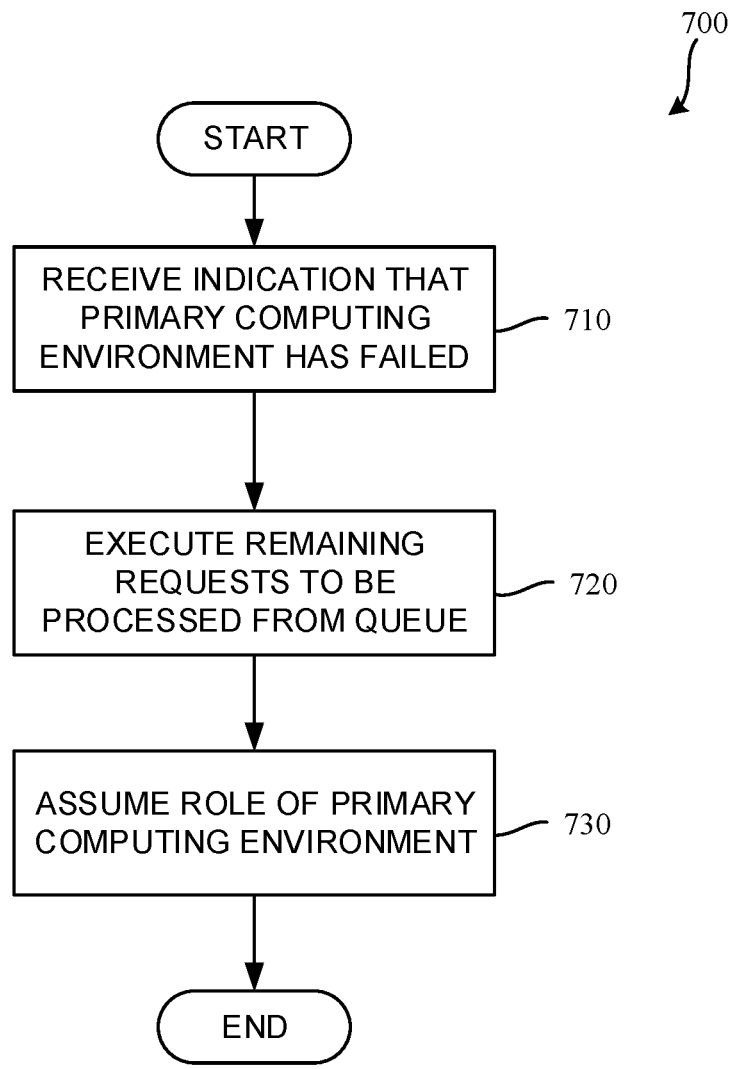
FIG. 7 is a flowchart representative of machine readable instructions which may be executed to implement the example secondary node of FIG. 4 to assume a role of a primary node.

FIG. 7 is a flowchart representative of machine readable instructions 700 which may be executed to implement the example secondary node of FIG. 4 to assume a role of a primary node. The example instructions 700 begin when the example request accessor 455 receives an indication that the primary computing environment 420 has failed. (Block 710). The example request accessor 455 causes the request executor 480 to execute any remaining requests to be processed from the request queue 475. (Block 720). In general, the execution of the remaining requests to be processed in the request queue 475 should be expected to take less than the latency threshold. Upon execution of the remaining requests to be processed, the example secondary computing environment 450 assumes the role of the primary computing system. (Block 730). The example secondary computing environment 450 assumes the role of the primary computing environment by the response provider 490 informing the proxy 410 that execution of the remaining requests is complete and that future requests that are to be sent to a primary computing environment should be sent to the request accessor 455 of the (formerly) secondary computing environment 450. In some examples, the data storage engine 300 adjusts an amount of compute resources that are allocated to the secondary computing environment 450 to, for example, increase the expected performance of the secondary computing environment 450.

Figure 8:
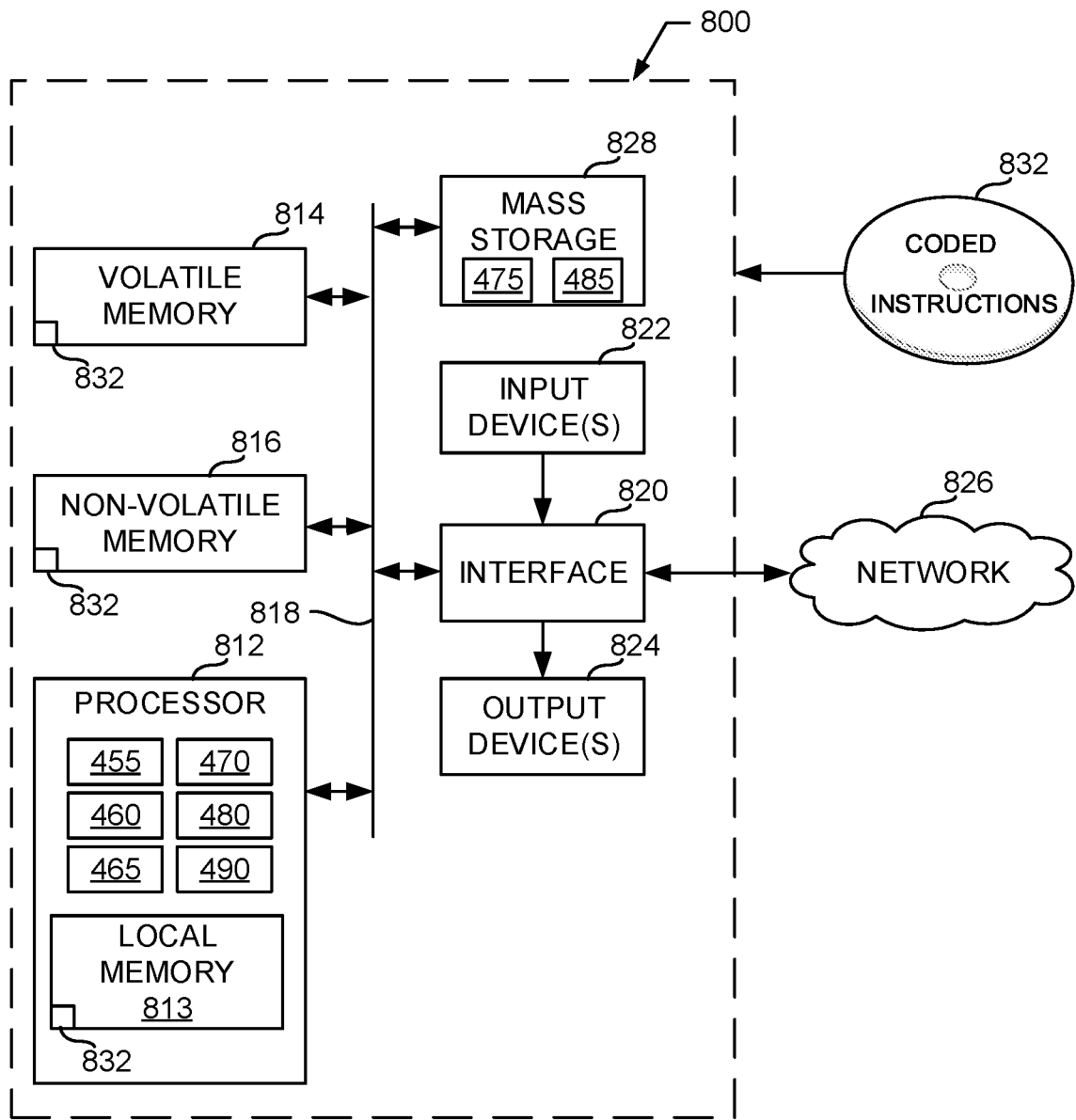
FIG. 8 is a block diagram of an example processing platform structured to execute the instructions of FIG. 6 and/or 7 to implement the example secondary node of FIG. 4.

FIG. 8 is a block diagram of an example processing platform structured to execute the instructions of FIG. 6 and/or 7 to implement the example secondary node of FIG. 4. The processor platform 800 can be, for example, a server, a personal computer, a workstation, a self-learning machine (e.g., a neural network), or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example request accessor 455, the example resource determiner 460, the example latency estimator 465, the example threshold comparator 470, the example request executor 480, and the example response provider 490.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 6 and/or 7 may be stored in the mass storage device 828, in the volatile memory 814, in the non-volatile memory 816, and/or on a removable non-transitory computer readable storage medium such as a CD or DVD.

Figure 9:
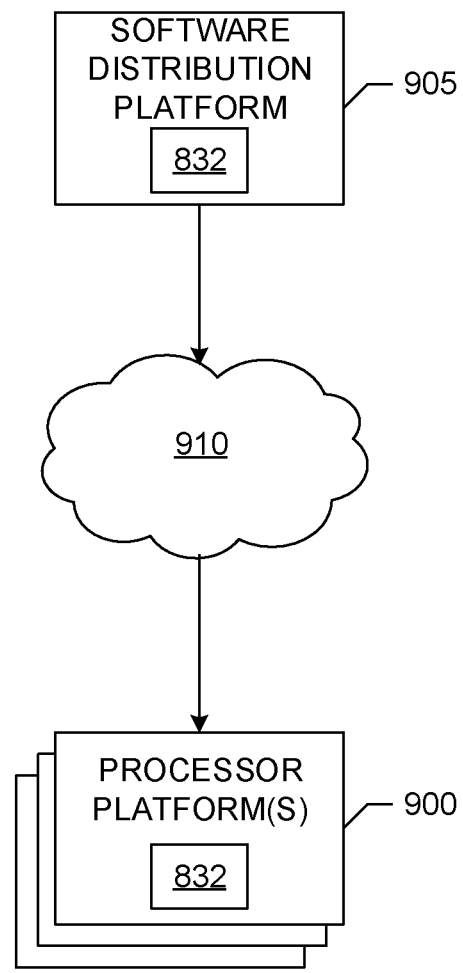
FIG. 9 is a block diagram of an example software distribution platform to distribute software (e.g., software corresponding to the example computer readable instructions of FIGS. 6 and/or 7) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 905 to distribute software such as the example computer readable instructions 832 of FIG. 8 to third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 832 of FIG. 8. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the computer readable instructions 832, which may correspond to the example computer readable instructions 600, 700 of FIGS. 6 and/or 7, as described above. The one or more servers of the example software distribution platform 905 are in communication with a network 910, which may correspond to any one or more of the Internet and/or any of the example networks 826 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 832 from the software distribution platform 905. For example, the software, which may correspond to the example computer readable instructions 600, 700 of FIGS. 6 and/or 7, may be downloaded to the example processor platform 800, which is to execute the computer readable instructions 832 to implement the secondary computing environment 450. In some example, one or more servers of the software distribution platform 905 periodically offer, transmit, and/or force updates to the software (e.g., the example computer readable instructions 832 of FIG. 8) to ensure improvements, patches, updates, etc. are distributed and applied to the software at the end user devices.

From the foregoing, it will be appreciated that example methods, apparatus and articles of manufacture have been disclosed that enable load shedding to ensure that unprocessed computing loads at secondary computing environments do not become excessive. Advantageously, in the instance where a request is rejected because it would cause too much latency at a secondary computing environment, the request originator can decide whether such rejected request is to be resubmitted for execution at the secondary computing environment. In some examples, avoidance of such resubmission of the execution request effectively removes processing load that would have ultimately been placed on the secondary computing system, allowing for reduced staleness of requests to be processed at the secondary computing environment. The disclosed methods, apparatus and articles of manufacture improve the efficiency of using a computing device by rejecting requests for execution of instructions that would have otherwise caused excessive latency at the secondary computing environment. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture for load shedding are disclosed herein. Further examples and combinations thereof include the following:

Example 1 includes a computer system comprising memory, and at least one processor to execute machine readable instructions to cause the at least one processor to at least access a request to execute a process using a second computing environment, the second computing environment being a replica of a first computing environment, determine an expected execution latency associated with execution of the process using the second computing environment, and reject the request in response to the expected execution latency exceeding a threshold.

Example 2 includes the computer system of example 1, wherein the at least one processor is to calculate an expected resource need for processing of the request at the second computing environment, the expected execution latency determined based on the expected resource need.

Example 3 includes the computer system of example 2, wherein to determine the expected execution latency, the at least one processor is to determine, based on the expected resource need for processing of the request, a first expected completion time for execution of the process using the second computing environment, and determine a second expected completion time for execution of the process using the first computing environment, wherein the expected execution latency is based on a difference between the first and second expected completion times.

Example 4 includes the computer system of example 2, wherein the at least one processor is to calculate the expected resource need based on at least one of an availability of compute resources at the second computing environment, a size of the request, a number of arguments in the request, or a number of libraries imported by the request.

Example 5 includes the computer system of example 2, wherein the at least one processor is to calculate the expected resource need based on a performance statistic of the request having been processed at the first computing environment.

Example 6 includes the computer system of example 1, wherein to reject the request, the at least one processor is to transmit a notification to an originator of the request to cause the request originator to resubmit the request to the second computing environment at a later time.

Example 7 includes the computer system of example 1, wherein the at least one processor is to select an order in which requests received at the second computing environment are to be performed, the selection of the order to prioritize requests that have a low expected effect on latency of the second computing environment.

Example 8 includes the computer system of example 1, wherein the at least one processor is to execute requests that have not yet been processed at the second computing environment, and cause the second computing environment to assume a role of the first computing environment.

Example 9 includes the computer system of example 1, wherein the first computing environment and the second computing environment have a known resource asymmetry.

Example 10 includes at least one non-transitory computer readable medium comprising instructions that, when executed, cause at least one processor to at least access a request to execute a process using a second computing environment, the second computing environment being a replica of a first computing environment, determine an expected execution latency associated with execution of the process using the second computing environment, and reject the request in response to the expected execution latency exceeding a threshold.

Example 11 includes the at least one non-transitory computer readable medium of example 10, wherein the instructions, when executed, further cause the at least one processor to calculate an expected resource need for processing of the request at the second computing environment, the expected execution latency determined based on the expected resource need.

Example 12 includes the at least one non-transitory computer readable medium of example 11, wherein the determining of the expected execution latency includes determine, based on the expected resource need for processing of the request, a first expected completion time for execution of the process using the second computing environment, and determine a second expected completion time for execution of the process using the first computing environment, wherein the expected execution latency is based on a difference between the first and second expected completion times.

Example 13 includes the at least one non-transitory computer readable medium of example 11, wherein the calculation of the expected resource need is based on at least one of an availability of compute resources at the second computing environment, a size of the request, a number of arguments in the request, or a number of libraries imported by the request.

Example 14 includes the at least one non-transitory computer readable medium of example 11, wherein the calculation of the expected resource need is based on a performance statistic of the request having been processed at the first computing environment.

Example 15 includes the at least one non-transitory computer readable medium of example 10, wherein the instructions, when executed, cause the at least one processor to transmit a notification to an originator of the request to cause the request originator to resubmit the request to the second computing environment at a later time.

Example 16 includes the at least one non-transitory computer readable medium of example 10, wherein the instructions, when executed, cause the at least one processor to select an order in which requests received at the second computing environment are to be performed, the selection of the order to prioritize requests that have a low expected effect on latency of the second computing environment.

Example 17 includes the at least one non-transitory computer readable medium of example 10, wherein the instructions, when executed, cause the at least one processor to execute requests that have not yet been processed at the second computing environment, and cause the second computing environment to assume a role of the first computing environment.

Example 18 includes the at least one non-transitory computer readable medium of example 10, wherein the first computing environment and the second computing environment have a known resource asymmetry.

Example 19 includes a computer-implemented method comprising accessing a request to execute a process using a second computing environment, the second computing environment being a replica of a first computing environment, determining an expected execution latency associated with execution of the process using the second computing environment, and rejecting the request in response to the expected execution latency exceeding a threshold.

Example 20 includes the method of example 19, further including calculating an expected resource need for processing of the request at the second computing environment, the expected execution latency determined based on the expected resource need.

Example 21 includes the method of example 20, wherein the determining of the expected execution latency includes determining, based on the expected resource need for processing of the request, a first expected completion time for execution of the process using the second computing environment, and determining a second expected completion time for execution of the process using the first computing environment, wherein the expected latency is based on a difference between the first and second expected completion times.

Example 22 includes the method of example 20, wherein the calculating of the expected resource need is based on at least one of an availability of compute resources at the second computing environment, a size of the request, a number of arguments in the request, or a number of libraries imported by the request.

Example 23 includes the method of example 20, wherein the calculating of the expected resource need is based on a performance statistic of the request having been processed at the first computing environment.

Example 24 includes the method of example 19, wherein the rejecting of the request includes transmitting a notification to an originator of the request to cause the request originator to resubmit the request to the second computing environment at a later time.

Example 25 includes the method of example 19, further including selecting an order in which requests received at the second computing environment are to be performed, the selection of the order to prioritize requests that have a low expected effect on latency of the second computing environment.

Example 26 includes the method of example 19, further including executing requests that have not yet been processed at the second computing environment, and causing the second computing environment to assume a role of the first computing environment.

Example 27 includes the method of example 19, wherein the first computing environment and the second computing environment have a known resource asymmetry.

Example 28 includes an apparatus comprising a request accessor to access a request to execute a process using a second computing environment, the second computing environment being a replica of a first computing environment, a latency estimator to determine an expected execution latency associated with execution of the process using the second computing environment, and a threshold comparator to reject the request in response to the expected execution latency exceeding a threshold.

Example 29 includes the apparatus of example 28, further a resource determiner to calculate an expected resource need for processing of the request at the second computing environment, wherein the latency estimator is to determine the expected execution latency based on the expected resource need.

Example 30 includes the apparatus of example 29, wherein to determine the expected execution latency, the latency estimator is to determine, based on the expected resource need for processing of the request, a first expected completion time for execution of the process using the second computing environment, and determine a second expected completion time for execution of the process using the first computing environment, wherein the expected execution latency is based on a difference between the first and second expected completion times.

Example 31 includes the apparatus of example 29, wherein the resource determiner is to calculate the expected resource need based on at least one of an availability of compute resources at the second computing environment, a size of the request, a number of arguments in the request, or a number of libraries imported by the request.

Example 32 includes the apparatus of example 29, wherein the resource determiner is to calculate the expected resource need based on a performance statistic of the request having been processed at the first computing environment.

Example 33 includes the apparatus of example 28, further including a response provider to transmit a notification to an originator of the request to cause the request originator to resubmit the request to the second computing environment at a later time.

Example 34 includes the apparatus of example 28, further including a request executor to select an order in which requests received at the second computing environment are to be performed, the selection of the order by the request executor to prioritize requests that have a low expected effect on latency of the second computing environment.

Example 35 includes the apparatus of example 34, wherein in the event of a failure of the primary computing environment, the request executor is to execute requests that have not yet been processed at the second computing environment, and the response provider is to cause the second computing environment to assume a role of the first computing environment.

Example 36 includes the apparatus of example 28, wherein the first computing environment and the second computing environment have a known resource asymmetry.

Example 37 includes a computer-implemented method comprising receiving a request to execute a process using a first computing environment, calculating an expected resource need for processing of the request, determining an expected replication lag associated with execution of the process using the first computing environment and replication of the execution of the process by a second computing environment, and rejecting the request in response to the expected replication lag exceeding a threshold.

Example 38 includes the method of example 37, wherein determining the expected replication lag includes determining, based on the expected resource need for processing of the request, a first expected completion time for execution of the process using the first computing environment, and determining, a second expected completion time for replicating the execution of the process using the second computing environment, wherein the expected replication lag is based on a difference between the first and second expected completion times.

Example 39 includes the method of example 37, wherein the first computing environment and the second computing environment have a known resource asymmetry.

Example 40 includes the method of example 37, wherein the calculating of the expected resource need is based on at least one of an availability of compute resources at the replica, a size of the request, a number of arguments in the request, or a number of libraries imported by the request.

Example 41 includes the method of example 37, wherein the calculating of the expected resource need is based on a performance statistic of the request having been processed at the master.

Example 42 includes the method of example 37, wherein the rejecting of the request includes transmitting a notification to an originator of the request to cause the request originator to resubmit the request at a later time.

Example 43 includes the method of example 37, further including selecting an order in which requests received at the replica are to be performed, the selection of the order to prioritize requests that have a low expected effect on latency of the replica.

Example 44 includes at least one non-transitory computer readable medium comprising instructions that, when executed, cause at least one processor to implement the method of any one of examples 37-43.

The following claims are hereby incorporated into this Detailed Description by this reference, with each claim standing on its own as a separate embodiment of the present disclosure.

What is claimed is:

1. A computer system comprising:
   memory; and
   at least one processor to execute machine readable instructions to cause the at least one processor to at least:
   access an electronic request to execute a process, wherein the process is to be executed using a first computing environment and a second computing environment, the first computing environment being a primary node and the second computing environment being a replica of the first computing environment, the first computing environment and the second computing environment having a known resource asymmetry;
   calculate an expected resource need for processing of the request at the second computing environment;
   determine, based on the expected resource need for processing of the request, a first expected completion time for execution of the process using the second computing environment;
   determine a second expected completion time for execution of the process using the first computing environment;
   determine an expected latency associated with execution of the process using the first computing environment, the expected latency further based on a difference between the first and second expected completion times; and
   selectively process the request based on the expected latency, wherein execution of the process at each of the first computing environment and the second computing environment is caused when the expected latency does not exceed a threshold and wherein a rejection of the request is signaled in response to the expected latency exceeding the threshold.

2. The computer system of claim 1, wherein the at least one processor is to calculate the expected resource need based on at least one of an availability of compute resources at the second computing environment, a size of the request, a number of arguments in the request, or a number of libraries imported by the request.

3. The computer system of claim 1, wherein the at least one processor is to calculate the expected resource need based on a performance statistic of the request having been processed at the first computing environment.

4. The computer system of claim 1, wherein to reject the request, the at least one processor is to transmit a notification to an originator of the request to cause the request originator to resubmit a second request at a later time.

5. The computer system of claim 1, wherein the at least one processor is to select an order in which requests received at the second computing environment are to be performed, the selection of the order to prioritize requests that have a low expected effect on latency of the second computing environment.

6. The computer system of claim 1, wherein the at least one processor is to:
   execute requests that have not yet been processed at the second computing environment; and
   cause the second computing environment to assume a role of the first computing environment.

7. The computer system of claim 1, wherein the first computing environment has more computing resources than the second computing environment.

8. At least one non-transitory computer readable medium comprising instructions that, when executed, cause at least one processor to at least:
   access an electronic request to execute a process, wherein the process is to be executed using a first computing environment and a second computing environment, the first computing environment being a primary node and the second computing environment being a replica of the first computing environment, the first computing environment and the second computing environment having a known resource asymmetry;
   calculate an expected resource need for processing of the request at the second computing environment
   determine, based on the expected resource need for processing of the request, a first expected completion time for execution of the process using the second computing environment;
   determine a second expected completion time for execution of the process using the first computing environment;
   determine an expected latency associated with execution of the process using the first computing environment, the expected latency based on a difference between the first and second expected completion times; and
   selectively process the request based on the expected latency, wherein the execution of the process at each of the first computing environment and the second computing environment is caused when the expected latency does not exceed a threshold and wherein a rejection of the request is signaled in response to the expected latency exceeding the threshold.

9. The at least one non-transitory computer readable medium of claim 8, wherein the first computing environment is allocated more compute resources than the second computing environment.

10. The at least one non-transitory computer readable medium of claim 8, wherein the calculation of the expected resource need is based on a performance statistic of the request having been processed at the first computing environment.

11. The at least one non-transitory computer readable medium of claim 8, wherein the instructions, when executed, cause the at least one processor to at least transmit a notification to an originator of the request to cause the request originator to resubmit a second request at a later time.

12. The at least one non-transitory computer readable medium of claim 8, wherein the instructions, when executed, cause the at least one processor to at least select an order in which requests received at the second computing environment are to be performed, the selection of the order to prioritize requests that have a low expected effect on latency of the second computing environment.

13. A computer-implemented method comprising:
   accessing an electronic request to execute a process, wherein the process is to be executed using a first computing environment and a second computing environment, the first computing environment being a primary node and the second computing environment being a replica of the first computing environment, the first computing environment and the second computing environment having a known resource asymmetry;
   calculating an expected resource need for processing of the request at the second computing environment determining, based on the expected resource need for processing of the request, a first expected completion time for execution of the process using the second computing environment;

determining a second expected completion time for execution of the process using the first computing environment;

determining an expected latency associated with execution of the process using the first computing environment, the expected latency further based on a difference between the first and second expected completion times; and selectively processing the request based on the expected latency, wherein execution of the process at each of the first computing environment and the second computing environment is caused when the expected latency does not exceed a threshold and a a rejection of the request is signaled in response to the expected latency exceeds the threshold.

14. The method of claim 13, wherein the calculating of the expected resource need is based on at least one of an availability of compute resources at the second computing environment, a size of the request, a number of arguments in the request, or a number of libraries imported by the request.

15. The method of claim 13, wherein the calculating of the expected resource need is based on a performance statistic of the request having been processed at the first computing environment.

16. The method of claim 13, wherein the signaling of the rejection of the request includes transmitting a notification to an originator of the request to cause the request originator to resubmit a second request at a later time.

17. The method of claim 13, further including selecting an order in which requests received at the second computing environment are to be performed, the selection of the order to prioritize requests that have a low expected effect on latency of the second computing environment.

18. The method of claim 13, further including:
executing requests that have not yet been processed at the second computing environment; and
causing the second computing environment to assume a role of the first computing environment.

19. The method of claim 13, wherein the request to execute the process is a first request, the expected latency is a first expected latency, and further including:
accepting a second electronic request to execute the process using the first computing environment and the second computing environment;
calculating a second expected latency; and
causing execution of the process at each of the first computing environment and the second computing environment in response to the second expected latency not exceeding the threshold.

20. The method of claim 13, wherein the first computing environment is allocated more compute resources than the second computing environment.

* * * * *